US010118366B2

(12) United States Patent
Colino Vega et al.

(10) Patent No.: US 10,118,366 B2
(45) Date of Patent: Nov. 6, 2018

(54) UNIT COMPRISING A FORMWORK BOARD INCLUDING A HOUSING AND A REPAIRING ELEMENT SUITABLE FOR BEING FIXED TO THE HOUSING, AND REPAIRING METHOD OF A FORMWORK BOARD (71) Applicant: ULMA C Y E, S. COOP., Oñati (ES)

(72) Inventors: Manuel Colino Vega, Vitoria-Gasteiz (ES); Jon Iñaki Leceta Lasa, Bergara (ES)

(73) Assignee: ULMA CYE, S. COOP., Oñati (ES)

( * ) Notice: Subject to any disclaimer, the term of this patent is extended or adjusted under 35 U.S.C. 154(b) by 287 days.

(21) Appl. No.: 14/782,779

(22) PCT Filed: Apr. 8, 2014

(86) PCT No.: PCT/EP2014/057061
§ 371 (c)(1),
(2) Date: Oct. 6, 2015

(87) PCT Pub. No.: WO2014/166951
PCT Pub. Date: Oct. 16, 2014

(65) Prior Publication Data
US 2016/0039175 A1   Feb. 11, 2016

(30) Foreign Application Priority Data
Apr. 12, 2013   (EP) ..................... 13382133

(51) Int. Cl.
*B32B 7/02*   (2006.01)
*E04G 19/00*   (2006.01)
(Continued)

(52) U.S. Cl.
CPC ............... *B32B 7/02* (2013.01); *B29C 73/04* (2013.01); *B32B 5/18* (2013.01); *B32B 27/065* (2013.01);
(Continued)

(58) Field of Classification Search
CPC ........................................................ B32B 7/02
(Continued)

(56) References Cited
U.S. PATENT DOCUMENTS 5,807,051 A * 9/1998 Heminger ............. F16B 13/141
411/82
2005/0210796 A1   9/2005 Frenzl

FOREIGN PATENT DOCUMENTS

DE   102005015383 A1 * 10/2006   ............... E04G 9/05
DE   102005015383 A1   10/2006
(Continued)

OTHER PUBLICATIONS

International Search Report in corresponding PCT Application No. PCT/EP2014/057061, dated Jun. 13, 2014.

*Primary Examiner* — Brent T O'Hern
(74) *Attorney, Agent, or Firm* — Edell, Shapiro & Finnan, LLC (57) ABSTRACT A repair element for a formwork board that includes a housing. The repairing element comprising a first member made of thermoplastic material and a second member made of porous material, wherein the second member acts as a support of the first member, the first member being arranged on the second member. The first member has a height that partially projects from the board once the repairing element is fixed in the housing, the first member being suitable for filling a cavity existing between the repairing element and the housing once the repairing element is placed in the housing after being at least partially melted, thus sealing the attachment between the repairing element and the board. Repairing method of the board with the repairing element.

15 Claims, 5 Drawing Sheets (51) Int. Cl.
    *B29C 73/04*       (2006.01)
    *B32B 5/18*        (2006.01)
    *B32B 27/06*      (2006.01)
    *B29K 101/12*     (2006.01)
    *B29K 105/00*     (2006.01)

(52) U.S. Cl.
    CPC .......... *E04G 19/00* (2013.01); *B29K 2101/12* (2013.01); *B29K 2105/253* (2013.01); *B32B 2266/0235* (2013.01); *B32B 2398/20* (2013.01); *B32B 2556/00* (2013.01)

(58) Field of Classification Search
    USPC ......................................................... 428/67
    See application file for complete search history.

(56) References Cited

FOREIGN PATENT DOCUMENTS

| | | | | |
|---|---|---|---|---|
| DE | 202012004515 U1 * | 5/2012 | ............... | E04G 9/02 |
| DE | 202012004515 U1 | 5/2015 | | |

* cited by examiner

UNIT COMPRISING A FORMWORK BOARD INCLUDING A HOUSING AND A REPAIRING ELEMENT SUITABLE FOR BEING FIXED TO THE HOUSING, AND REPAIRING METHOD OF A FORMWORK BOARD

CROSS-REFERENCE TO RELATED APPLICATIONS

This application relates to and claims the benefit and priority to International Application PCT/EP2014/057061, filed Apr. 8, 2014, which claims the benefit and priority to European Application No. EP13382133, filed Apr. 12, 2013.

TECHNICAL FIELD

The present invention is related to a unit comprising a formwork board including a housing and a repairing element suitable for being fixed to the housing, and to a repairing method of a formwork board.

BACKGROUND

Boards used in construction for creating formworks are known. Generally, such boards are usually made of wood or a plastic material. These boards are usually used many times and are exposed to impacts, adverse weather conditions, etc., so they usually become damaged relatively easily. As is known, it is necessary for the surface of the board against which the concrete is going to set to be flat given that the imperfections that said surface may have are finally transferred to the set concrete, which must be prevented. To avoid those imperfections, formwork boards are usually repaired.

Substantially cylindrical repairing elements that are inserted in a hole previously made in the board are generally used for repairing boards. Said repairing element is fixed to the board by means of gluing, nailing or other known fixing methods.

DE 10 2005 015 383 A1 discloses a formwork board comprising a wooden core covered with layers of plastic in which a substantially cylindrical housing going through one of the layers of plastic and partially through the wooden core is made, the housing further comprising a recess in the layer of plastic. The repairing element is made of plastic material having characteristics similar to those of the layer of plastic of the board, particularly having a similar melt flow rate. To repair the board, the housing is heated up to its melting temperature and the repairing element is inserted, a force being applied on the repairing element by means of a press or other external means such that part of the repairing element expands, contacting the recess of the board, both being fused to one another and filling the bottom of the housing.

US 2005/0210796 A1 describes a repairing element made of thermoplastic material which is inserted in a housing previously made in the board and is heated until plasticizing, the material penetrating into the material of the board, both being attached after solidification. A drawback of such repairing elements is that said elements have to have dimensions corresponding to the housing in which they are going to be inserted, such that once they are inserted the cavity between the repairing element and the housing is minimal and they must be level with the surface of the board.

SUMMARY OF THE DISCLOSURE

The object of the invention is to provide a unit comprising a formwork board including a housing and a repairing element suitable for being fixed to the housing and a repairing method of a formwork board.

A first aspect is related to a unit comprising a formwork board including a housing and a repairing element comprising a first member made of the thermoplastic material and a second member made of porous material. The second member acts as a support of the first member, the first member being arranged on the second member.

The first member partially projects from the board once the repairing element is fixed in the housing. Furthermore, said first member is configured for filling a cavity existing between the repairing element and the housing once the repairing element is housed in the housing after being at least partially melted, thus sealing the attachment between the repairing element and the board.

A repairing element that does not have to be adapted exactly to the dimensions of the housing of the board, there being clearance between both, is thus obtained. This thus prevents the need to mill the housing and/or to manufacture a repairing element with great precision, and therefore to manufacture fabrication elements adapted to each housing.

A second aspect is related to a repairing method of a formwork board. According to one implementation the method comprises the following steps: making at least one housing of a particular depth in the formwork board, introducing the repairing element in the housing, melting at least one part of the first member of the repairing element such that the material of the first member flows, filling the cavity existing initially between the housing and the repairing element, and removing the material of the repairing element which projects from the surface of the board such that the repairing element is substantially aligned with the surface of the board.

The obtained reparation method is a simple and quick method to carry out. Furthermore, a repaired board having better quality is obtained; the durability of the repair is improved. Regardless of the working conditions to which the board is subjected during use, the repairing element keeps the housing sealed, and furthermore it does not interact with the concrete.

These and other advantages and features will become apparent in view of the drawings and the detailed description.

DETAILED DESCRIPTION

Figure 1:
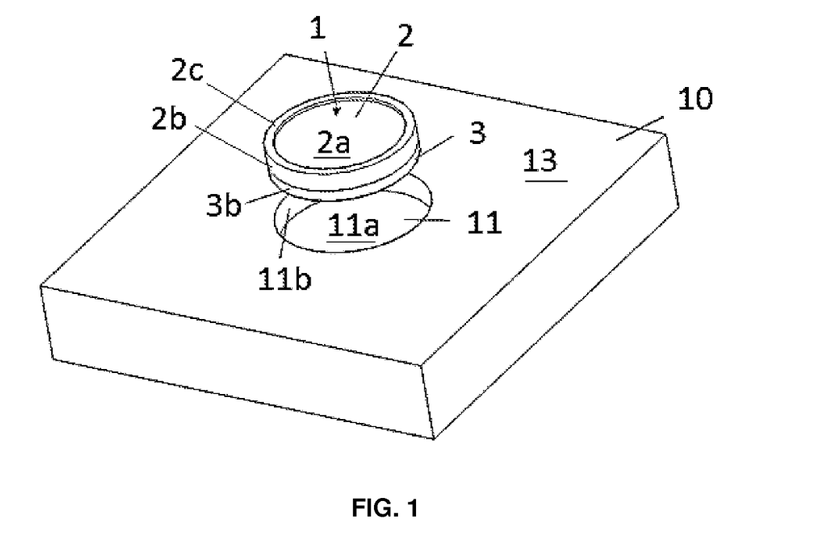
FIG. 1 shows a perspective view of a formwork board before being repaired.
Figure 2:
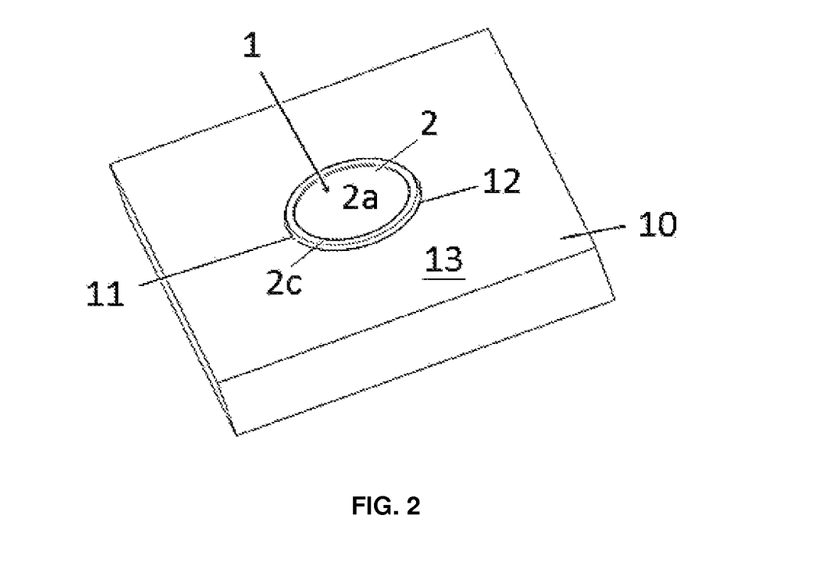
FIG. 2 shows a perspective view of the formwork board and the repairing element shown in FIG. 1, the repairing element being housed in the formwork board.
Figure 3:
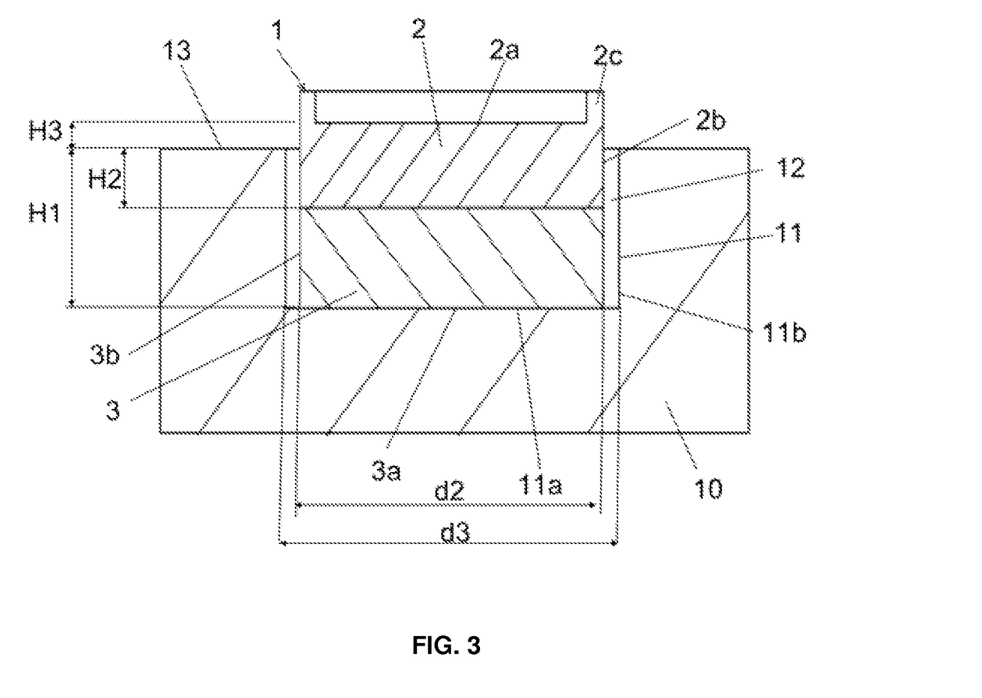
FIG. 3 shows a cross-section of the formwork board and the repairing element shown in FIG. 1 inserted in the housing of said board.
Figure 4:
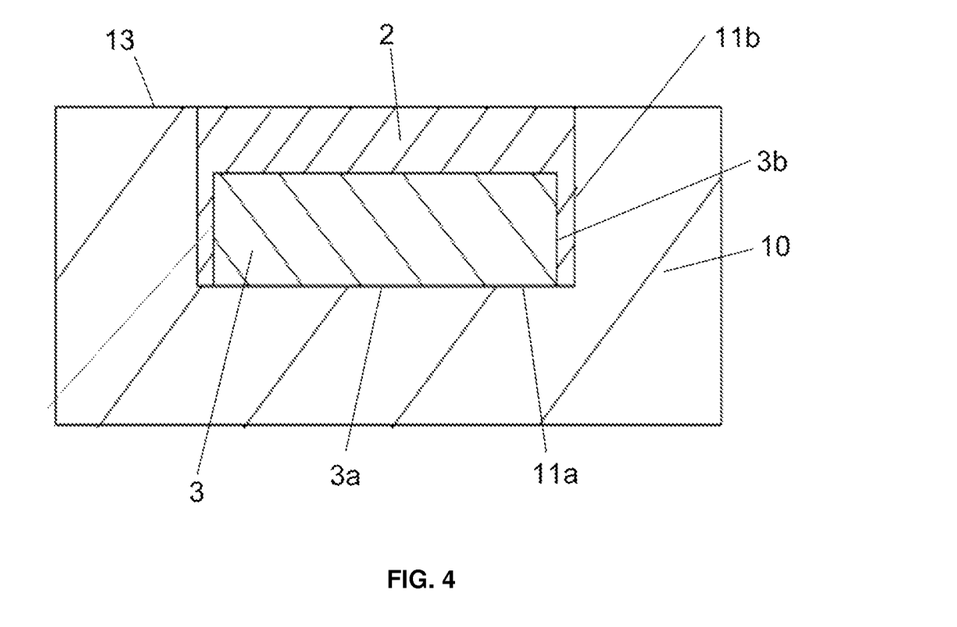
FIG. 4 shows a cross-section of the formwork board that has been repaired with the repairing element shown in FIG. 1.

FIGS. 1 to 3 show a repairing element 1 according to one implementation that is suitable for being fixed to a housing 11 of a formwork board 10. The repairing element 1 comprises a first member 2 made of thermoplastic material and a second member 3 made of porous material. The second member 3 acts as a support of the first member 2, the first member 2 being arranged on the second member 3. According to one implementation, the second member 3 is injection molded on the first member 2, the repairing element 1 being obtained.

The second member 3 is made of thermoplastic material having a low shrinkage percentage upon injection to minimize the shrink cavities and/or excessive deformations during injection that would have a negative effect on the board repair quality. This shrinkage percentage is less than 2.5%, and preferably less than 0.4%.

To repair the board 10, it is necessary to first make the housing 11 of depth H1 in the board 10. The housing 11 is not a through passage, but rather has a height H1 that is less than the total height of the repairing element 1. The repairing element 1 is subsequently introduced in said housing 11. The repairing element 1 is configured for being housed in the housing 11 such that the first member 2 partially projects from the board 10. Therefore, the second member 3 is configured for being housed completely in the housing 11, whereas the first member 2 is configured for being housed partially in the housing 11, projecting from said housing 11. Once the second member 3 is housed in the housing 11, a base 3a of the second member 3 is fixed to the bottom wall 11a of the housing 11. Given that the dimensions of the repairing element 1, and particularly of the second member 3, are smaller than the dimensions of the housing 11, a cavity 12 communicated with the outside and demarcated by a wall 11b of the housing 11, a wall 3b of the second member 3, a wall 2b of the first member 2 and the bottom wall 11a of the housing 11 is formed.

Before introducing the repairing element 1 in the housing 11, a layer of adhesive is applied on the bottom wall 11a of the housing and/or on the bottom 3a of the second member 3 of the repairing element 1. Therefore, once the repairing element 1 is introduced in the housing 11, said repairing element 1 is fixed through the adhesive. Particularly, fixing of the repairing element 1 to the board 10 through an adhesive is carried out in boards made of wood.

In contrast, for the case of boards made of plastic materials, particularly thermoplastics, adhesive cannot be used given that it does not fix them very well. In said cases, heat is applied on the bottom wall 11a of the housing 11, such that the material of the board 10 softens, partially plasticizing, allowing said material to adhere to the second member 3, particularly to the base 3a of the second member 3, through the pores of the porous material of the second member 3. The melting temperature of the material of the second member 3 is greater than the melting temperature of the material of the housing 11. According to one implementation, heat is applied to the bottom wall 11a of the housing 11 by means of a heat gun.

Since the base 3a of the second member 3 is fixed to the board 10, the repairing element 1 can be centered with respect to the housing 11, substantially concentric to said housing 11. Therefore, the material flows during the subsequent step of melting at least one part of the first member 2, filling the entire cavity 12, a substantially homogenous seal being formed along the entire perimeter of the repairing element 1 with respect to the housing 11. Once the material of the first melted member 2 has cooled, it completely seals said cavity 12. Finally, the material of the first member 2 which projects from the surface 13 of the board 10 is removed, the resulting repairing element 1 being level with the surface 13 of the board 10, as shown in FIG. 3.

A heat source is applied with a heat gun to melt the first member 2, although any other known heat means or any other means that allow melting said material could be used.

The material of the first member 2 has a melting temperature that is lower than the melting temperature of the material of the second member 3, as well as of the material of the board 10. Therefore, when the first member 2 is heated to melt it, only said first member 2 melts.

According to one implementation, both the first member 2 and the second member 3 have a substantially cylindrical geometry. In turn, the housing 11 of the board 10 has a substantially cylindrical geometry defined by a diameter d3 that is greater than diameter d2 of the repairing element 1.

Generally, the first member 2 projects a minimum height H3 of about 0.5 mm once the repairing element 1 is fixed in the housing 11, the height H3 corresponding to the distance between an outer surface 2a of the first member 2 and the surface 13 of the board 10. It is thus assured that when the material of the first member 2 melts, it completely fills the cavity 12, and furthermore there continues to be material projecting from the surface 13. The first member 2 is housed inside the housing 11 a minimum height H2 of about 0.5 mm, such that it assures that once the cavity 12 is filled with the molten material of the first member 2, and the material of the first member 2 which projects from the surface 13 is subsequently removed, there continues to be a layer of material of the first member 2 on the second member 3.

According to one implementation the first member 2 further comprises an annular projection 2c extending from an outer surface 2a of the first member 2 as shown in FIGS. 1 to 3. Said annular projection 2c assures that there is enough material to completely fill the cavity 12.

The first member 2 is made of a material having a high melt flow rate at a low temperature, which allows injecting said material on the second member 3 in a simple manner. Furthermore, since it is a very fluid material, it helps seal the cavity 12, optimally covering the walls 11b and 2b of the housing 11 and of the first member 2, respectively. According to one implementation the first member 2 has a melt flow rate greater than 4 g/10 min, measured according to UNE-EN ISO 1133 standard at a temperature of 120° C. and with a weight of 2.16 kg.

Figure 5:
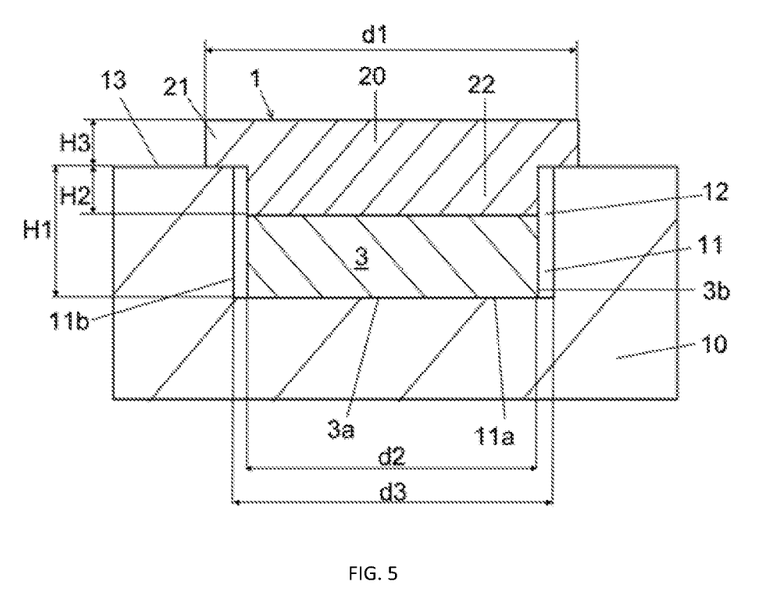
FIG. 5 shows a cross-section of another implementation with the repairing element inserted in the housing of a formwork board.
Figure 6:
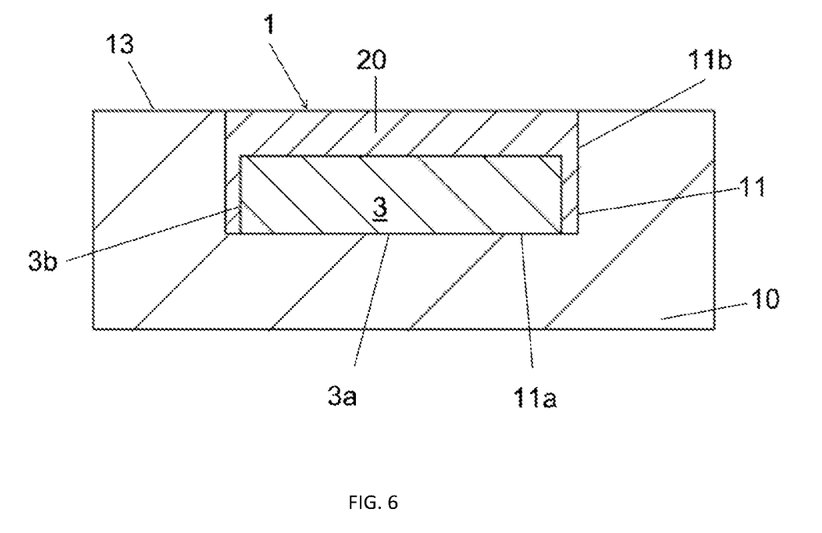
FIG. 6 shows a cross-section of the formwork board that has been repaired with the repairing element shown in FIG. 5.

According to another implementation as shown in FIGS. 5 and 6, the repairing element 1 differs from the repairing element discussed above in conjunction with FIGS. 1 through 4 in that the geometry of the first member 20 is different, the remaining features as well as the repair process being similar, so it is not considered necessary to describe them again.

The first member 20 comprises a first substantially cylindrical part 21 defined by a diameter d1 and a second part 22, continuous to said first part 21, which is substantially cylindrical, and defined by a diameter d2, the diameter d2 of the second part 22 being less than diameter d1 of the first part 21 and less than diameter d3 of the housing 11. Once the repairing element 1 is inserted in the housing 11 of the board 10, the second part 22 of the first member 20 is housed in the housing 11, whereas the first part 21 of the first member 20 is arranged outside the housing 11, supported on the surface 13 of the board 10.

In other embodiments in which the repairing element 1 and/or the housing 11 have geometries other than cylindrical, the maximum width d2 of the second part 22 will be less than the maximum width dl of the first part 21, and it will furthermore be less than the minimum width d3 of the corresponding housing.

The first member 20 has to have a particular height such that it projects a minimum height H3 of about 0.5 mm from the surface 13 of the board 10 once the repairing element 1 is fixed in the housing 11. It is therefore assured that when the material of the first member 20 melts, it completely fills the cavity 12, and furthermore there continues to be material projecting from the surface 13 after the cavity 12 is filled. Once the repairing element 1 is housed in the housing 11, the first member 20 must be housed in said housing 11 a minimum height H2 of about 0.5 mm, such that it assures that once the cavity 12 is filled with the material of the first member 20, the second member 3 continues to have a layer of molten material of the first member 20, even once the repairing element 1 is f level with the board 10, removing the excess material from the surface 13.

Figure 7:
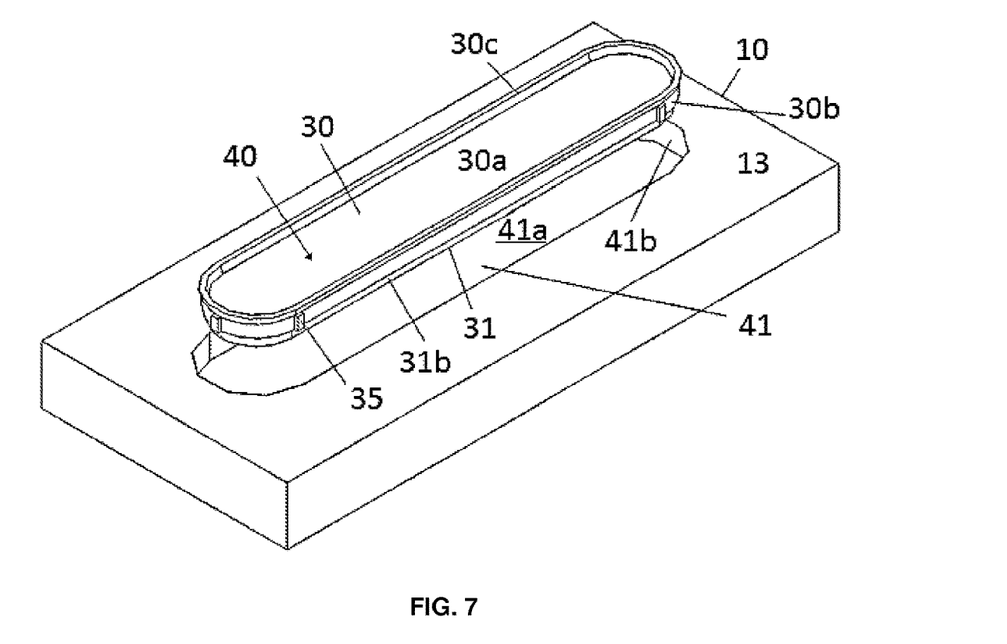
FIG. 7 shows a perspective view of a formwork board and repairing element according to another implementation.
Figure 8:
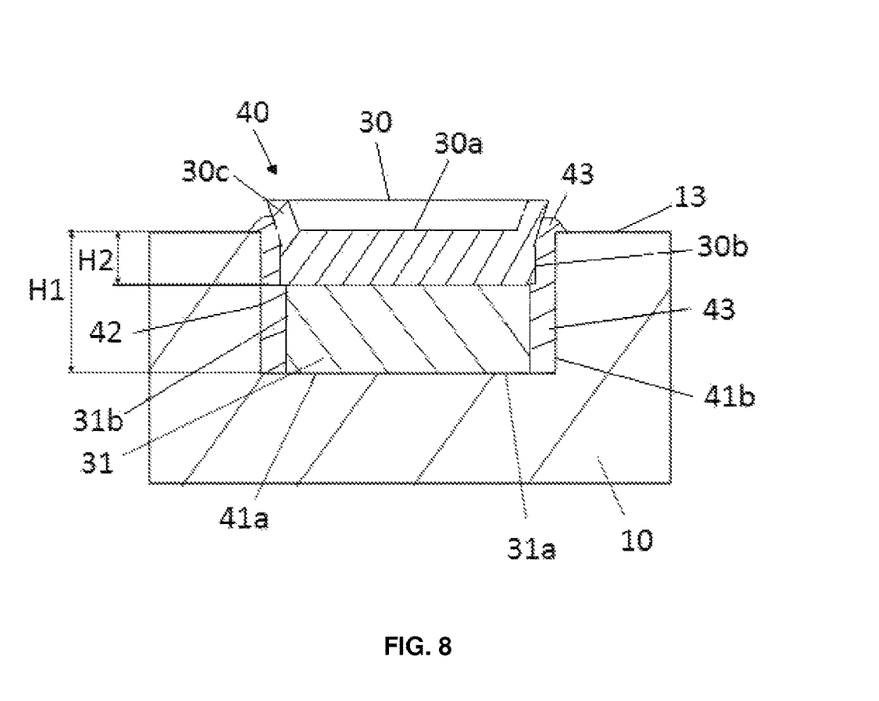
FIG. 8 shows a cross-section of the formwork board with the repairing element shown in FIG. 7 inserted in the housing of the formwork board.
Figure 9:
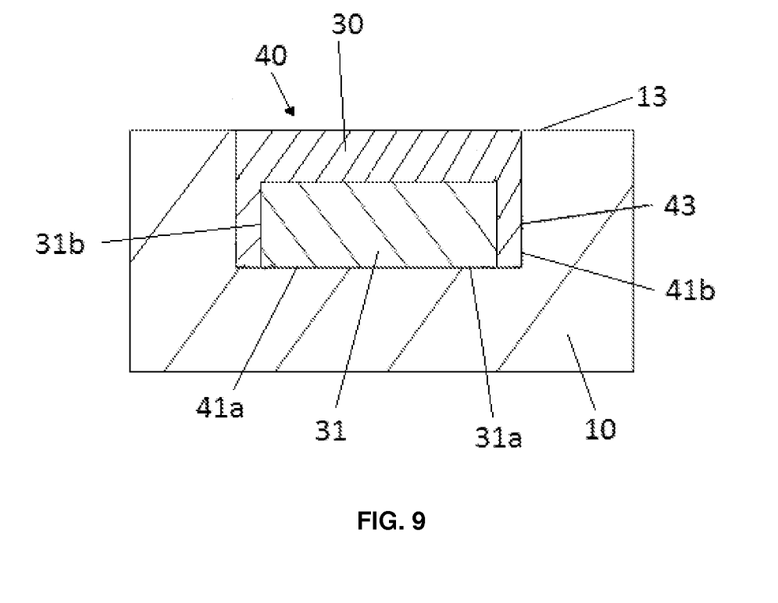
FIG. 9 shows a cross-section of the formwork board that has been repaired with the repairing element shown in FIG. 7.

FIGS. 7 to 9 show another implementation. The repairing element 40 differs from the repairing element of the preceding implementations in the geometry of the first member 30 and of the second member 31, the remaining features being similar, so it is not considered necessary to describe them again.

The housing 41 of the board 10 has an oval geometry. At the same time, both the first member 30 and the second member 31 have an oval geometry. According to some implementations the first member 30 comprises ribs 35 extending from a wall 30b of the first member 30. Said ribs 35 are distributed along the wall 30b. The repairing element 40 may be centered with respect to the housing 41 as a result of said ribs 35.

The first member 30 comprises an annular projection 30c extending from a base 30a, projecting out of the housing 41 once the repairing element 40 is housed in the housing 41.

Concerning the repair process, once the housing 41 is made, a layer 43 is applied on a bottom 41a of the housing 41 before introducing the repairing element 40. This layer 43 is made of the same material as the first member 30. The layer 43 is distributed in a molten state along the perimeter of the housing 4. The layer 43 is distributed in a molten state on the bottom 41a by any known heating or melting means. The repairing element 40 is subsequently fixed to the bottom 41a through a base 31a of the second member 31.

The repairing element 40, particularly the bottom 31a of the second member 31, is fixed to the bottom 41a in a manner similar to that described above in conjunction with the implementation of FIGS. 1 through 4. An adhesive is applied when the board is made of wood, whereas the bottom 41a of the housing 41 is melted when the material of the board is a thermoplastic.

Pressure is subsequently applied to the repairing element 40, substantially making the base 30a of the first member 30 level with the surface 13 of the board 10. The melted layer 43 projects from the housing 41, contacting the projection 30c of the first member 30. The projection 30c extends outwardly at an angle with respect to the base 30a. This inclination aids in melting the projection 30c when it contacts the melted layer 43. Finally, the excess material is removed by means of a cutting tool, the resulting repairing element 40 being flush with the surface 13 of the board. Any cutting tool known in the state of the art can be used as a cutting tool.

Since the repairing element 40 is arranged substantially centered with respect to the housing 41, the resulting cavity 42 defined by the wall 41b and the bottom 41a of the housing 41 and the walls 30b and 31b of the repairing element 40 has a substantially constant section. A substantially homogenous final seal is therefore obtained along the entire perimeter of the repairing element 40 with respect to the housing 41.

As in the other implementations described herein, the melting temperature of the layer 43 and of the first element 30 is less than the melting temperature of the material of the housing 42 and of the second member 31.

The second member 3, 31 may be made of polyvinyl chloride (PVC) or of any other porous material.

The material of the first member 2, 20, 30 of any of the implementations preferably has a high percentage of elongation at fracture, greater than 40% calculated according to the UNE-EN ISO 1133 standard. It is preferably greater than 200%. This feature means that the board that has been repaired with the repairing element adapts better to the geometric changes it experiences and to the adverse conditions it experiences during use.

Finally, it should be understood that the invention is not limited to the particular examples described above but may be designed and altered in a multitude of varieties. Moreover, although a unit comprising a formwork board and a repairing element has been described, it should be understood that the invention also covers a repairing element comprising the features described for any of the implementations.

The invention claimed is:
1. An assembly comprising:
a board having a surface and a housing that extends partially into the board, the housing having an opening at the surface of the board, the housing including a bottom wall, a side wall and a first height dimension as measured between the bottom wall of the housing and the surface of the board; and
a repairing element located inside the housing, the repairing element including:
a first member made of a thermoplastic material having a top surface,
a second member made of a porous material onto which the first member is supported, the thermoplastic material of the first member being a different material than the porous material of the second member, the second member having a base, the first and second members having a combined second height dimension as measured between the base of the second member and the top surface of the first member, the second height dimension being greater than the first height dimension such that the first member at least partially extends above the surface of the board, the second member including pores that enhance the second member's ability to be bonded to the bottom wall of the housing, the second member dimensioned such that a cavity exists between the side wall of the housing and at least a portion of the repairing element, the first member having a volume sufficient to fill the cavity upon the first member being melted.

2. The assembly according to claim 1, wherein the volume of the first member is sufficient to fill the cavity upon the first member being melted while at least partially projecting from the surface of the board.

3. The assembly according to claim 1, wherein the second member is made of a thermoplastic material.

4. The assembly according to claim 3, wherein the melting temperature of the first member is less than the melting temperature of the second member.

5. The assembly according to claim 1, wherein the first member comprises an annular projection extending from the top surface.

6. The assembly according to claim 5, wherein the annular projection extends outwardly at an angle with respect to the top surface.

7. The assembly according to claim 1, wherein the first member comprises a side wall having a one or more projections extending outwardly from the side wall.

8. The assembly according to claim 7, wherein the first member comprises a side wall having a plurality of projections extending outwardly from the side wall and arranged to assist in centering the repairing element in the housing.

9. The assembly according to claim 1, wherein the first member comprises a first part of a first maximum width dimension and a second part of a second maximum width dimension that is less than the first maximum width dimension, the second part being suitable for being housed in the housing of the board with the second maximum width dimension being less than a minimum width dimension of the housing.

10. The assembly according to claim 1, wherein the first member is injection molded on the second member.

11. The assembly according to claim 1, wherein the first member and the second member are substantially cylindrical and are arranged substantially coaxial to one another.

12. The assembly according to claim 1, wherein the first member is made of a material having a percentage of elongation at fracture greater than 40%.

13. The assembly according to claim 1, wherein the second height dimension is selected so that the top surface of the first member projects from the surface of the board by at least 0.5 millimeters.

14. The assembly according to claim 1, wherein the second member is made of polyvinyl chloride.

15. The assembly according to claim 4, wherein the board is made of a plastic having a melting temperature, the melting temperature of the first member being less than the melting temperature of the plastic.

* * * * *